United States Patent
Ishii et al.

(10) Patent No.: US 9,544,512 B2
(45) Date of Patent: Jan. 10, 2017

(54) IMAGE CAPTURING APPARATUS AND METHOD OF READING OUT PIXEL SIGNALS FROM AN IMAGE SENSOR

(71) Applicant: CANON KABUSHIKI KAISHA, Tokyo (JP)

(72) Inventors: Mie Ishii, Tokyo (JP); Teruyuki Okado, Matsudo (JP)

(73) Assignee: Canon Kabushiki Kaisha, Tokyo (JP)

( * ) Notice: Subject to any disclaimer, the term of this patent is extended or adjusted under 35 U.S.C. 154(b) by 61 days.

(21) Appl. No.: 14/276,831

(22) Filed: May 13, 2014

(65) Prior Publication Data

US 2014/0340554 A1 Nov. 20, 2014

(30) Foreign Application Priority Data

May 16, 2013 (JP) ................................ 2013-104516
Mar. 24, 2014 (JP) ................................ 2014-060829

(51) Int. Cl.
*H04N 5/235* (2006.01)
*H04N 3/14* (2006.01)
*H04N 5/343* (2011.01)
*H04N 5/345* (2011.01)
*H04N 5/347* (2011.01)

(52) U.S. Cl.
CPC .............. *H04N 5/343* (2013.01); *H04N 5/347* (2013.01); *H04N 5/3456* (2013.01)

(58) Field of Classification Search
CPC .............................. H04N 5/347; H04N 5/3456
See application file for complete search history.

(56) References Cited

U.S. PATENT DOCUMENTS

2005/0195304 A1* 9/2005 Nitta et al. ..................... 348/308
2011/0080503 A1* 4/2011 Okada et al. .................. 348/234

FOREIGN PATENT DOCUMENTS

JP 2007-173950 A 7/2007
JP 2010-034895 A 2/2010

* cited by examiner

*Primary Examiner* — Sinh Tran
*Assistant Examiner* — Selam T Gebriel
(74) *Attorney, Agent, or Firm* — Cowan, Liebowitz & Latman, P.C.

(57) ABSTRACT

An image capturing apparatus including an image sensor including a pixel region in which a plurality of pixels are arranged in a row direction and a column direction, and readout unit for reading out pixel signals from the plurality of pixels, setting unit for setting an imaging condition and control unit for selecting one of a readout mode between thinning readout mode in which the pixel signals are read out from the plurality of pixels while thinning out the plurality of pixels and a mixing readout mode in which the pixel signals of the plurality of pixels are mixed and readout according to the imaging condition set by the setting unit.

14 Claims, 12 Drawing Sheets

|  | DRIVING MODE | | |
| --- | --- | --- | --- |
|  | TEMPERATURE < 5°C | 5°C ≤ TEMPERATURE < 45°C | TEMPERATURE ≥ 45°C |
| ISO100 | MIXING | MIXING | MIXING |
| ISO200 | MIXING | MIXING | MIXING |
| ISO400 | MIXING | MIXING | MIXING |
| ISO800 | THINNING | MIXING | MIXING |
| ISO1600 | THINNING | THINNING | MIXING |
| ISO3200 | THINNING | THINNING | THINNING |

|  | DRIVING MODE |
|---|---|
| ISO100 | MIXING |
| ISO200 | MIXING |
| ISO400 | MIXING |
| ISO800 | THINNING |
| ISO1600 | THINNING |
| ISO3200 | THINNING |

FIG. 11

|  | DRIVING MODE | | |
|---|---|---|---|
|  | TEMPERATURE < 5°C | 5°C ≤ TEMPERATURE < 45°C | TEMPERATURE ≥ 45°C |
| ISO100 | MIXING | MIXING | MIXING |
| ISO200 | MIXING | MIXING | MIXING |
| ISO400 | MIXING | MIXING | MIXING |
| ISO800 | THINNING | MIXING | MIXING |
| ISO1600 | THINNING | THINNING | MIXING |
| ISO3200 | THINNING | THINNING | THINNING |

F I G. 14

| | DRIVING MODE |
|---|---|
| ISO100 | FIRST MIXING |
| ISO200 | FIRST MIXING |
| ISO400 | FIRST MIXING |
| ISO800 | SECOND MIXING |
| ISO1600 | SECOND MIXING |
| ISO3200 | SECOND MIXING |

F I G. 15

| | DRIVING MODE | | |
|---|---|---|---|
| | TEMPERATURE < 5°C | 5°C ≤ TEMPERATURE < 45°C | TEMPERATURE ≥ 45°C |
| ISO100 | FIRST MIXING | FIRST MIXING | FIRST MIXING |
| ISO200 | FIRST MIXING | FIRST MIXING | FIRST MIXING |
| ISO400 | FIRST MIXING | FIRST MIXING | FIRST MIXING |
| ISO800 | SECOND MIXING | FIRST MIXING | FIRST MIXING |
| ISO1600 | SECOND MIXING | SECOND MIXING | FIRST MIXING |
| ISO3200 | SECOND MIXING | SECOND MIXING | SECOND MIXING |

IMAGE CAPTURING APPARATUS AND METHOD OF READING OUT PIXEL SIGNALS FROM AN IMAGE SENSOR

BACKGROUND OF THE INVENTION

Field of the Invention

The present invention relates to an image capturing apparatus using an image sensor such as a CMOS image sensor, and a method of controlling the same.

Description of the Related Art

In recent years, an image sensor such as a CMOS image sensor is often used for a digital camera and video camera. Recent digital cameras as well as video cameras have a function of capturing and recording a moving image.

If an image sensor with more than 10 million pixels is used, when capturing a still image, it is possible to obtain a high-resolution image by reading out all the pixels of the image sensor. On the other hand, the number of pixels required for capturing a moving image is different from that for capturing a still image and, for example, the resolution of an HD format called Full HD is 1,920×1,080 pixels (about 2 million pixels). That is, to record a moving image using an image sensor with more than 10 million pixels, it is necessary to decrease the number of pixels.

Examples of a method of decreasing the number of pixels are thinning processing of skipping a pixel at a predetermined interval, addition processing of adding a predetermined number of pixel signals when outputting them from the image sensor, and crop processing of reading out only a specific pixel region.

These methods can be executed by an image processing unit or the like after reading out all the pixel signals from the image sensor, or executed within the image sensor or when reading out pixel signals from the image sensor. In the latter case, the number of pixels read out from the image sensor is smaller, and thus a data amount transferred from the image sensor is smaller. Therefore, the latter case is advantageous in increasing the speed of an operation of reading out the pixel signals.

As a method of performing addition processing for pixel signals within an image sensor, Japanese Patent Laid-Open No. 2010-034895 discloses a method of adding charges in a floating diffusion region (Floating Diffusion: FD) in the vertical direction, which is connected to photoelectric conversion units.

Furthermore, Japanese Patent Laid-Open No. 2007-173950 discloses a method of performing addition processing by simultaneously selecting a plurality of pixel rows by a row selecting circuit, and simultaneously outputting pixel signals on a plurality of rows.

As described in Japanese Patent Laid-Open No. 2010-034895, if the charges of pixels in the vertical direction are added in the FD, it is possible to obtain a high-quality image without moiré, but horizontal stripe noise is readily generated in an image due to noise via the parasitic capacitance of an addition switch. Especially when reading out pixel signals at a high gain to improve the sensitivity, not only the pixel signals but also noise is amplified. Therefore, as the sensitivity is higher, horizontal stripe noise is more conspicuous, thereby interfering with obtaining of high sensitivity.

As described in Japanese Patent Laid-Open No. 2007-173950, when mixing outputs of a plurality of pixels on a signal line, if the difference between the outputs of the pixels to be mixed is large, the mixed output is limited by an operation range, thereby degrading the image quality. In particular, imaging at a low gain is readily influenced since a large amount of charge is processed and thus the output difference between pixel signals is large.

SUMMARY OF THE INVENTION

The present invention has been made in consideration of the above problems of the conventional techniques, and implements an operation of reading out pixels while suppressing the influence of noise to obtain a moving image having a higher image quality in an image capturing apparatus using an image sensor capable of reading out pixels while decreasing the number of pixels, and a method of controlling the image capturing apparatus.

The first aspect of the present invention provides an image capturing apparatus comprising an image sensor including a pixel region in which a plurality of pixels are arranged in a row direction and a column direction, and readout unit for reading out pixel signals from the plurality of pixels, setting unit for setting an imaging condition and control unit for selecting, according to the imaging condition set by the setting unit, one of a thinning readout mode in which the pixel signals are read out from the plurality of pixels while thinning out the plurality of pixels and a mixing readout mode in which the pixel signals of the plurality of pixels are mixed and read out, and controlling the readout unit to read out the pixel signals in the selected readout mode.

The second aspect of the present invention provides an image capturing apparatus comprising, an image sensor including a pixel region in which a plurality of pixels are arranged in a row direction and a column direction, and readout unit for reading out pixel signals from the plurality of pixels and control unit for selecting, based on image quality of the pixel region in which the readout unit has read out the pixel signals from the plurality of pixels, one of a thinning readout mode in which the pixel signals are read out from the plurality of pixels while thinning out the plurality of pixels and a mixing readout mode in which the pixel signals of the plurality of pixels are mixed and read out, and controlling the readout unit to read out the pixel signals in the selected readout mode.

The third aspect of the present invention provides an image capturing apparatus comprising an image sensor including a pixel region in which a plurality of pixels are arranged in a row direction and a column direction, and readout unit for reading out pixel signals from the plurality of pixels, setting unit for setting an imaging condition and control unit for selecting, according to the imaging condition set by the setting unit, one of a first mixing readout mode in which charges of floating diffusions of the plurality of pixels are mixed and a second mixing readout mode in which the pixel signals of the plurality of pixels are output to a column output line and mixed, and controlling the readout unit to read out the pixel signals in the selected readout mode.

The fourth aspect of the present invention provides a method of controlling an image capturing apparatus including an image sensor that includes a pixel region in which a plurality of pixels are arranged in a row direction and a column direction and readout unit for reading out pixel signals from the plurality of pixels, and setting unit for setting an imaging condition, the method comprising, selecting, according to the imaging condition set by the setting unit, one of a thinning read mode in which the pixel signals are read out from the plurality of pixels while thinning out the plurality of pixels and a mixing readout mode in which the pixel signals of the plurality of pixels are mixed and read out, and controlling the readout unit to read out the pixel signals in the selected readout mode.

The fifth aspect of the present invention provides a method of controlling an image capturing apparatus including an image sensor that includes a pixel region in which a plurality of pixels are arranged in a row direction and a column direction and readout unit for reading out pixel signals from the plurality of pixels, the method comprising selecting, based on image quality of the pixel region in which the readout unit has read out the pixel signals from the plurality of pixels, one of a thinning readout mode in which the pixel signals are read out from the plurality of pixels while thinning out the plurality of pixels and a mixing readout mode in which the pixel signals of the plurality of pixels are mixed and read out, and controlling the readout unit to read out the pixel signals in the selected readout mode.

The sixth aspect of the present invention provides a method of controlling an image capturing apparatus including an image sensor that includes a pixel region in which a plurality of pixels are arranged in a row direction and a column direction and readout unit for reading out pixel signals from the plurality of pixels, and setting unit for setting an imaging condition, the method comprising selecting, according to the imaging condition set by the setting unit, one of a first mixing readout mode in which charges of floating diffusions of the plurality of pixels are mixed and a second mixing readout mode in which the pixel signals of the plurality of pixels are output to a column output line and mixed, and controlling the readout unit to read out the pixel signals in the selected readout mode.

Further features of the present invention will become apparent from the following description of exemplary embodiments (with reference to the attached drawings).

BRIEF DESCRIPTION OF THE DRAWINGS

FIG. 4 is a view showing the layout of the image sensor according to the present invention;

FIG. 10 is a table showing an example of switching conditions between mixing driving and thinning driving according to the first embodiment of the present invention;

FIG. 11 is a table showing an example of switching conditions between mixing driving and thinning driving according to the first embodiment of the present invention;

FIG. 14 is a table showing an example of switching conditions between mixing driving and thinning driving according to the third embodiment of the present invention; and FIG. 15 is a table showing an example of switching conditions between mixing driving and thinning driving according to the third embodiment of the present invention.

DESCRIPTION OF THE EMBODIMENTS

[First Embodiment]

Figure 1:
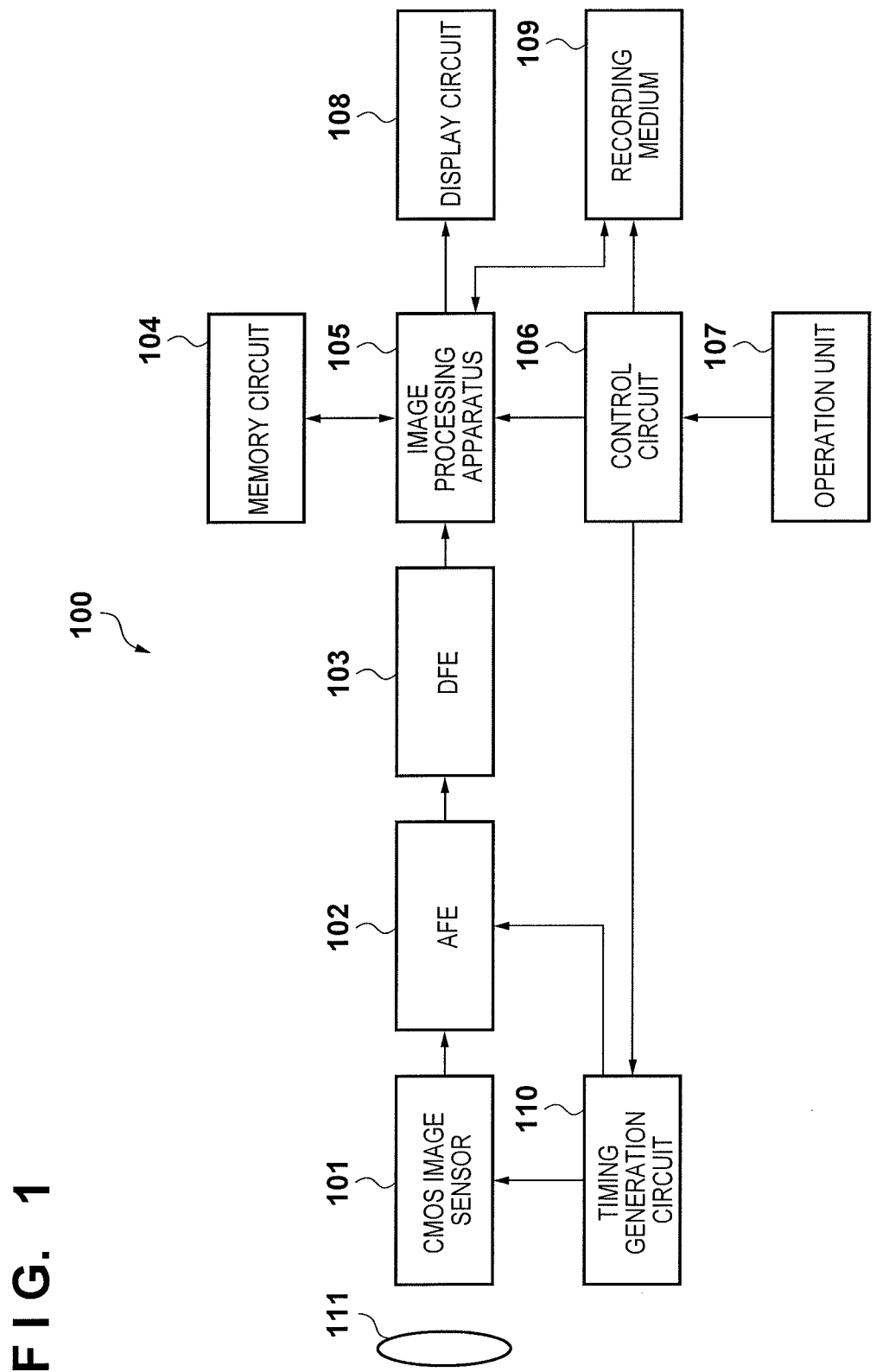
FIG. 1 is an overall block diagram showing an image capturing apparatus according to an embodiment of the present invention.

An image capturing apparatus using an image sensor according to the first embodiment of the present invention will be described with reference to an overall block diagram shown in FIG. 1. An image sensor 101 is, for example, a CMOS image sensor, and converts an optical image of an object input from an optical system 111 into an electrical signal. An analog front end 102 (AFE) is a signal processing circuit for performing signal processing of, for example, amplifying a signal output from the image sensor, and adjusting a black level (OB clamp). The AFE 102 receives an OB clamp timing signal or the like from a timing generation circuit 110, and converts the analog signal into a digital signal after performing the signal processing.

A digital front end 103 (DFE) performs digital processing of, for example, correcting the digital signal of each pixel, which has been converted by the AFE 102, and sorting the pixels. Note that the OB clamp processing can also be executed by the DFE 103. An image processing apparatus 105 performs processing for, for example, displaying a captured image on a display circuit 108, and recording image data in a recording medium 109 under the control of a control circuit 106. The recording medium 109 may be detachable like a semiconductor memory card.

The control circuit 106 controls an image capturing apparatus 100 as a whole, and controls the timing generation circuit 110 or the like upon receiving an instruction from an operation unit 107. A memory circuit 104 is used as a work memory for the image processing apparatus 105, and is also used as a buffer memory when image processing cannot keep up with continuous imaging or the like. The operation unit 107 includes a power switch, a shutter switch, and an input unit for setting imaging conditions. The shutter switch instructs the start of an image capture such as photometry processing and distance measurement processing, and also instructs the start of an imaging operation performed by driving a mirror and mechanical shutter.

Figure 2:
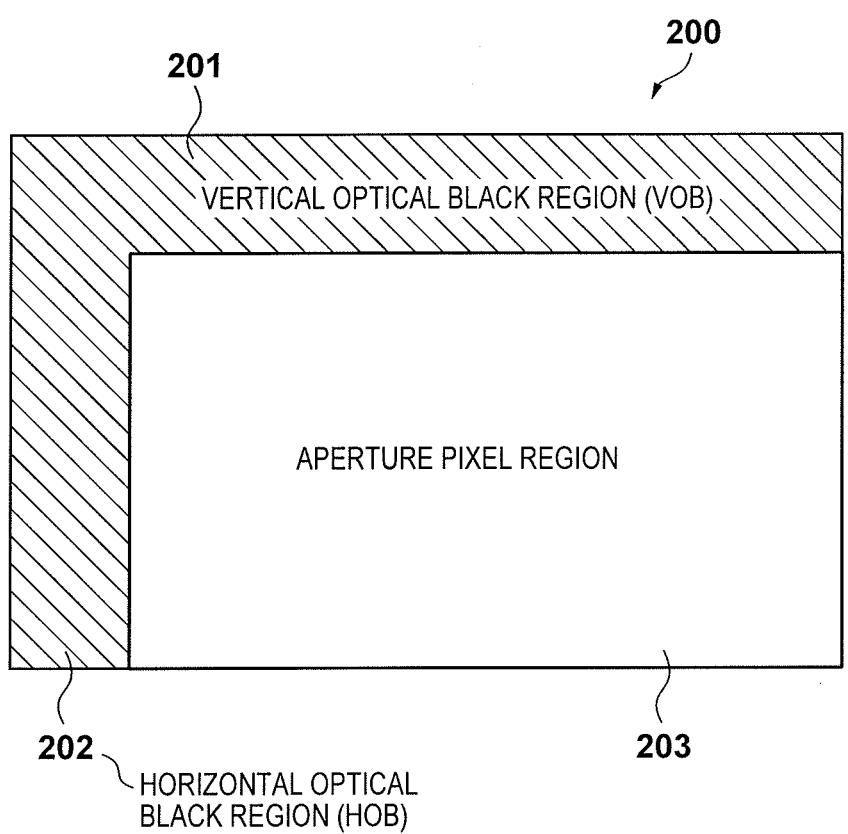
FIG. 2 is a view showing an example of the arrangement of the pixel region of an image sensor.

An example of the pixel region of the image sensor will be described with reference to FIG. 2. A pixel region 200 is formed by an aperture pixel region 203 having pixels which light from the optical system 111 enters, and a non-aperture pixel region which is adjacent to the aperture pixel region 203 and has shielded pixels from light. Each pixel in the aperture pixel region 203 accumulates charges generated according to incident light, and outputs a voltage signal corresponding to the accumulated charges as a pixel signal. The non-aperture pixel region is divided into a horizontal optical black pixel region (to be referred to as an HOB hereinafter) 202 and a vertical optical black pixel region (to be referred to as a VOB hereinafter) 201. The HOB 202 is a light-shielding region which is arranged to be adjacent to the start position (left side) of the aperture pixel region 203 in the horizontal direction (row direction). The VOB 201 is a light-shielding region which is arranged to be adjacent to the start position (upper side) of the aperture pixel region 203 in the vertical direction (column direction). The VOB 201 and HOB 202 have pixels similar to those in the aperture pixel region 203. The aperture pixel region 203 is not shielded from light, and the VOB 201 and HOB 202 are shielded from light.

An example of a circuit for three pixels when the image sensor 101 is a CMOS image sensor will be described with reference to FIG. 3. This example shows a circuit capable of adding (mixing) and outputting the charges of the three pixels adjacent to each other in the vertical direction, but the number of pixels whose charges are added (mixed) is not limited to three. Since each pixel has the same arrangement, the arrangement of the uppermost pixel will be explained as a representative example. A photodiode (PD) 301 receives an optical image formed by the optical system 111, and generates charges. The charges generated by the PD 301 are transferred to a floating diffusion (FD) 304 by a transfer MOS transistor 302, and converted into a voltage. When a selection MOS transistor 306 is controlled to be turned on, the voltage is output to a vertical (column) output line 307 as a pixel signal via an amplification MOS transistor 305. When a reset MOS transistor 303 is turned on, the potential of the FD 304 is reset to a voltage VDD and the potential of the PD 301 is reset to the voltage VDD via the transfer MOS transistor 302. An addition switch 308 connects the FDs 304 of the two pixels arranged to be adjacent to each other in the vertical direction. Turning on the addition switch 308 makes it possible to mix charges in the FDs 304 connected by the addition switch 308. When the plurality of selection MOS transistors 306 are turned on without turning on the addition switch 308, it is possible to output voltages corresponding to charges of the plurality of pixels onto the vertical output line 307.

A driving method of obtaining an image by performing vertical pixel addition using the above-described CMOS image sensor will be described in detail with reference to FIGS. 4 and 5. FIG. 4 is a view showing part of the pixel layout of the image sensor. FIG. 4 shows an example of 17×30 pixels for the sake of descriptive convenience. In fact, a number of pixels such as several thousand pixels×several thousand pixels are included. In the example shown in FIG. 4, pixels on the 0th to third rows are dummy pixels, pixels on the fourth to 15th rows are VOB pixels, and pixels on the 16th to 29th rows are effective pixels. In the effective pixels, R, G, and B color filters are arrayed in a Bayer pattern. FIG. 3 shows only the arrangement for one color for the sake of simplicity. In fact, however, the arrangement shown in FIG. 3 is adopted for each of R, G, and B. In this embodiment, a case in which the outputs of three pixels of the same color which are adjacent to each other in the vertical direction (column direction) are added (mixed) will be described.

Figure 4:
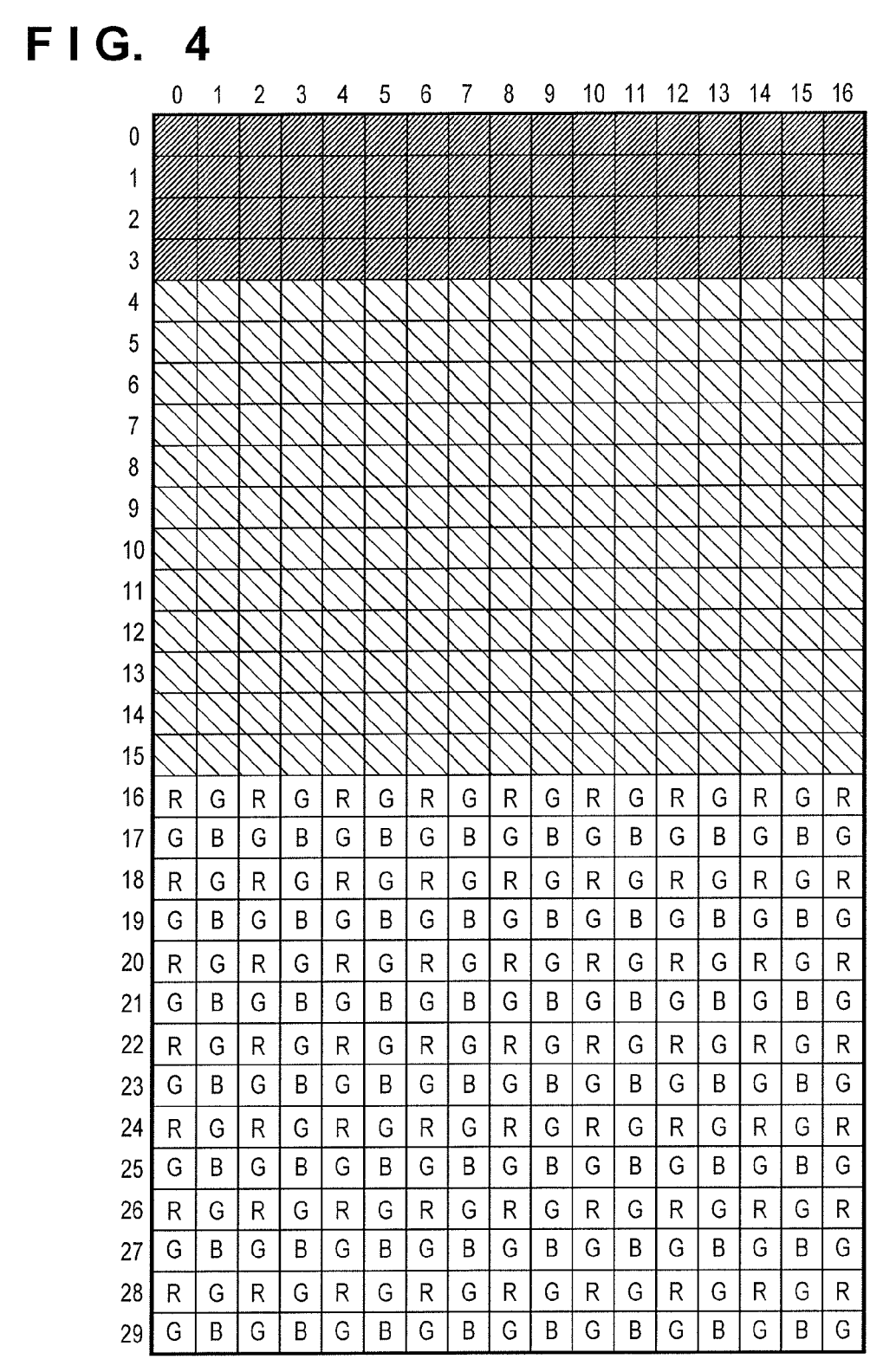
Figure 5:
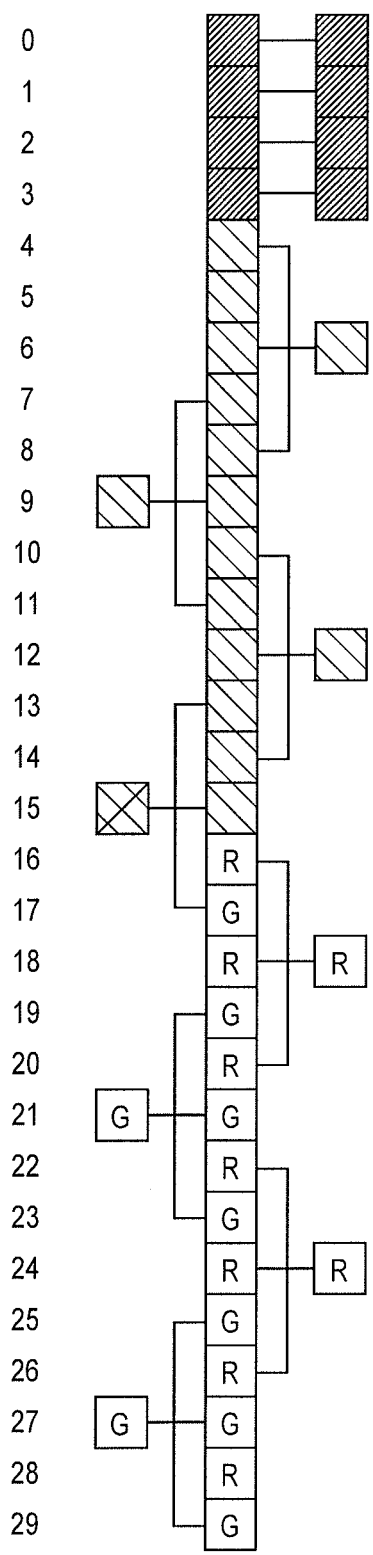
FIG. 5 is a view showing an example of a vertical mixing readout operation.

FIG. 5 is a view showing a vertical addition readout operation for the pixels on a given column in the pixel layout of FIG. 4. In this example, the dummy pixels are arranged to obtain a signal output serving as the reference of the black level, and each dummy pixel includes no PD 301 or addition switch 308 shown in FIG. 3. Therefore, the outputs of the dummy pixels are not added (mixed) in the vertical direction (column direction), and the signal of the pixel on each row is separately read out.

With respect to the outputs of the effective pixels, the outputs of three pixels of the same color, which are adjacent to each other in the vertical direction (column direction), are mixed and read out. FIG. 5 shows a column of R and G. For R pixels, the outputs of three pixels on the 16th, 18th, and 20th rows are mixed and read out. For G pixels, the outputs of three pixels on the 19th, 21st, and 23rd rows are mixed and read out. The same readout operation is performed for the subsequent effective pixels.

With respect to the output of the VOB pixels, the outputs of three pixels in the vertical direction (column direction) are added (mixed) and read out, similarly to the effective pixels. Since the VOB pixels are shielded pixels from light, they are not discriminated between colors but are desirably driven to perform addition (mixing) processing according to the same rules as those for the effective pixels. That is, in FIG. 5, the outputs of pixels on the fourth, sixth, and eighth pixels of the VOB pixel region are mixed and read out while the outputs of pixels on the seventh, ninth, and 11th rows are mixed and read out. By adding (mixing) the outputs in this way, it is possible to obtain the outputs of the VOB pixels without shifting the barycenter. Note that at the boundary between the VOB pixel and the effective pixel, the outputs of the two VOB pixels on the 13th and 15th rows and those of the one effective pixel (G pixel) on the 17th row are added (mixed) and read out. It is, however, desirable not to use this output signal for creating an image.

The DFE 103 corrects the outputs signals of the effective pixels using the thus readout output signals of the dummy pixels and those of the VOB pixels. The correction processing will be described below. Note that the correction processing is performed by the DFE 103 but may be executed by the image processing apparatus 105 or the like, as a matter of course.

The average value of the output signals of the dummy pixels on each column is calculated. The average value of the output signals of the dummy pixels is subtracted from the output pixel signal for each color from the effective pixels on the same column. This subtraction processing makes it possible to correct, in real time, vertical stripe noise and shading caused by the characteristics of a readout circuit. Note that to perform correction processing with high reliability, the population parameter (the number of rows) of the dummy pixels may belarge. As described above, however, since the output signals of the dummy pixels do not undergo addition processing even if the effective pixels are added and read out, the number of signals obtained from the dummy pixels does not decrease. Therefore, it is possible to obtain dummy pixel outputs whose population parameter is sufficient for calculation of a correction value (average value), without increasing the number of rows of the dummy pixels.

In general, if the photodiode (PD) serving as a photoelectric conversion unit accumulates charges, dark current noise is generated according to the accumulation time and environmental temperature. Since, however, each dummy pixel includes no photodiode (PD) serving as a photoelectric conversion unit, no dark current noise is generated. It is, therefore, possible to obtain a desired correction value without performing an addition reading, and to accurately correct fixed pattern noise generated for each column.

On the other hand, the dark current noise generated in the effective pixels is corrected using the output signals of the VOB pixels. The dark current noise depends on the charge accumulation time and environmental temperature, as described above. In each VOB pixel, a photodiode (PD) serving as a photoelectric conversion unit is arranged, similarly to the effective pixel. A dark current amount is obtained by calculating the average value of the output signals of the VOB pixels, which have been read out by performing addition reading, similarly to the effective pixels. Correcting the output signals of the effective pixels using the obtained dark current value can suppress the influence of the dark current. It is necessary to perform addition reading for the VOB pixels, similarly to the effective pixels. Since, however, it is possible to calculate a dark current correction value from all the VOB pixels, accurate correction can be performed without increasing the number of pixels so much.

Note that although a case in which each dummy pixel includes no addition switch 308 has been described in this embodiment, each dummy pixel may include an addition switch 308 like the effective pixel. Furthermore, if the dummy pixels are selected and read out a plurality of times, the population parameter of the dummy pixel output signals increases, thereby allowing correction while suppressing the influence of random noise. In this embodiment, decreasing the number of pixels in the horizontal direction (row direction) has not been especially explained. However, addition processing may be performed after reading out the signals of all the pixels. Alternatively, a well-known technique may be used to execute addition processing in the horizontal direction (row direction) within the image sensor.

With the above-described processing, it is possible to obtain a satisfactory image when performing driving for decreasing the number of pixels of the output of the image sensor having a large number of pixels, without increasing the circuit scale.

Figure 6:
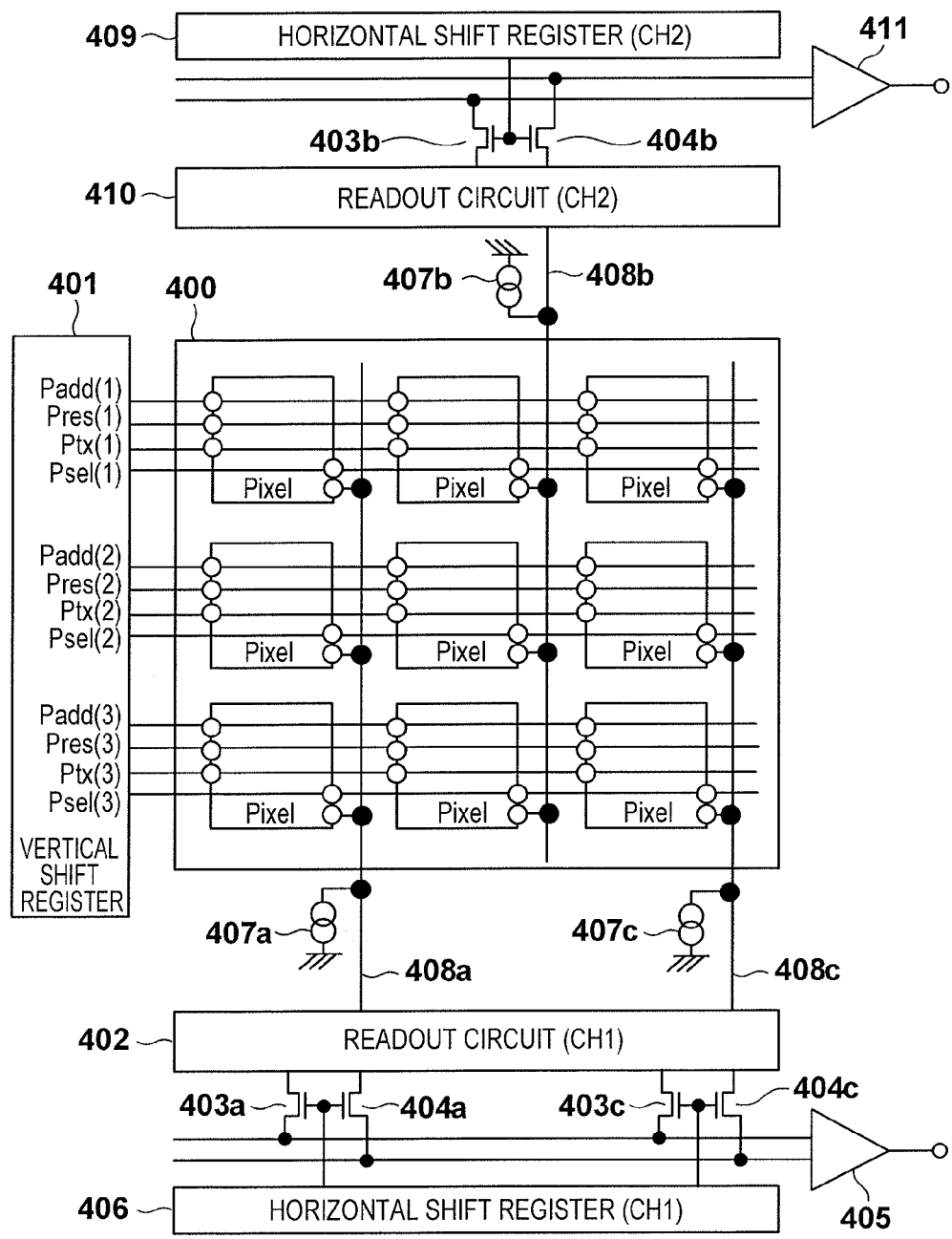
FIG. 6 is a block diagram showing an example of the arrangement of the image sensor.

FIG. 6 is a block diagram showing an example of the arrangement of the image sensor 101. In a pixel region 400 of the image sensor 101, a plurality of pixels are arranged in the row and column directions. For the sake of convenience, FIG. 6 shows 9 pixels of 3 rows×3 columns among the pixels arranged in the image sensor 101. A vertical shift register 401 outputs control signals to the pixel region 400 via first to fourth row selecting lines Ptx(1), Pres (1), Psel(1), and Padd(1) based on timing signals from the timing generation circuit 110, thereby controlling an operation of reading out pixel signals. In this embodiment, the respective pixels are controlled for each row, and output pixel signals to vertical output lines 408a to 408c each of which is connected to a readout circuit 402 or 410 depending on whether it is on an even-numbered column or odd-numbered column. Each of the vertical output lines 408a to 408c correspond to the vertical output line 307 shown in FIG. 3. Current sources 407a to 407c are connected to the vertical output lines 408a to 408c, respectively. The pixel signals on each vertical output line are input to the readout circuit 402 or 410, and input to a differential amplifier 405 or 411 via an n-channel transistor 403 or 404. Each of horizontal shift registers 406 and 409 controls ON/OFF of the transistors 403 and 404 based on timing signals from the timing generation circuit 110. Each of the differential amplifiers 405 and 411 receives a pixel signal and noise signal, and outputs a difference signal obtained by removing the noise from the pixel signal.

Figure 3:
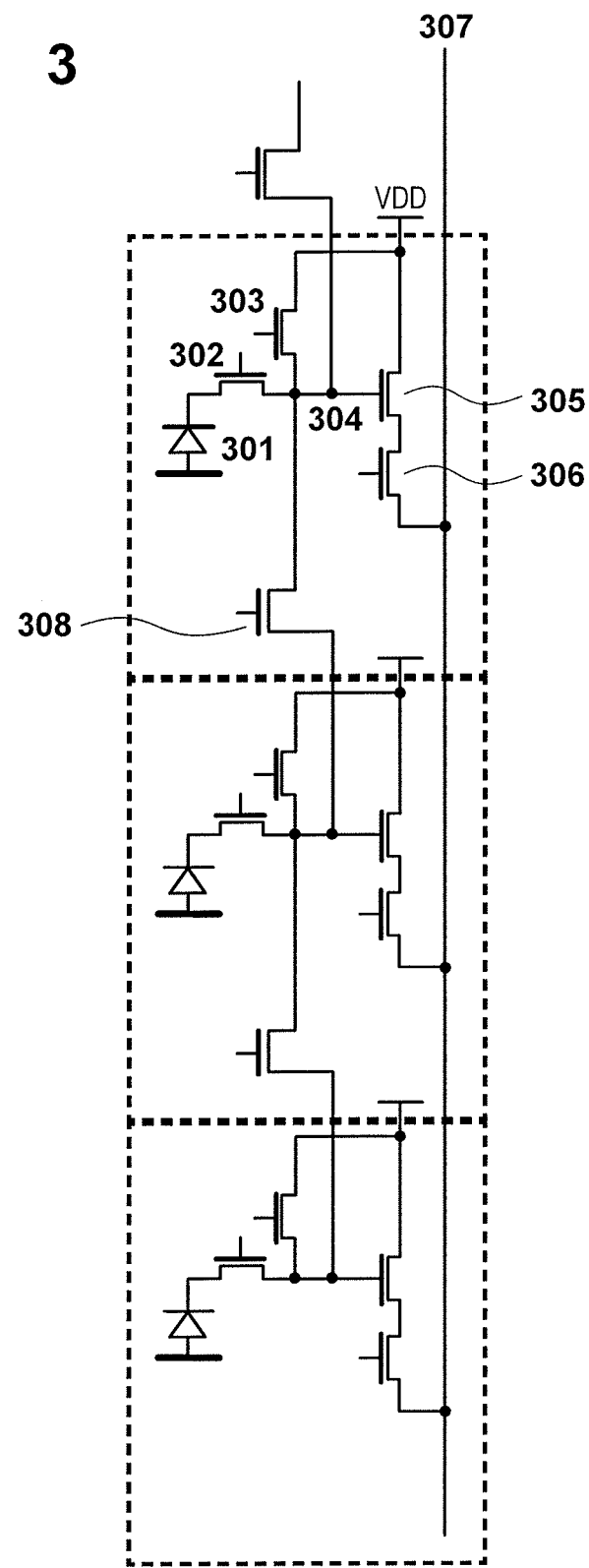
FIG. 3 is a circuit diagram showing pixels of a CMOS image sensor.

The gate of the transfer MOS transistor 302 shown in FIG. 3 is connected to the first row selecting line Ptx(1) arranged to extend in the horizontal direction of FIG. 6. The gates of the transfer MOS transistors of the remaining pixels arranged on the same row are also commonly connected to the first row selecting line Ptx(1). The gate of the reset MOS transistor 303 is connected to the second row selecting line Pres(1). The gates of the reset MOS transistors of the remaining pixels arranged on the same row are also commonly connected to the second row selecting line Pres(1). The gate of the selection MOS transistor 306 is connected to the third row selecting line Psel(1). The gates of the remaining selection MOS transistors 306 arranged on the same row are also commonly connected to the third row selecting line Psel(1). The gate of the addition switch 308 is connected to the fourth row selecting line Padd(1). The pixels arranged on the remaining rows are also connected to first to fourth row selecting lines Ptx(2) and Ptx(3), Pres(2) and Pres(3), Psel(2) and Pres(3), and Padd(2) and Padd(3) from the vertical shift register 401, and provided control signals.

Figure 7:
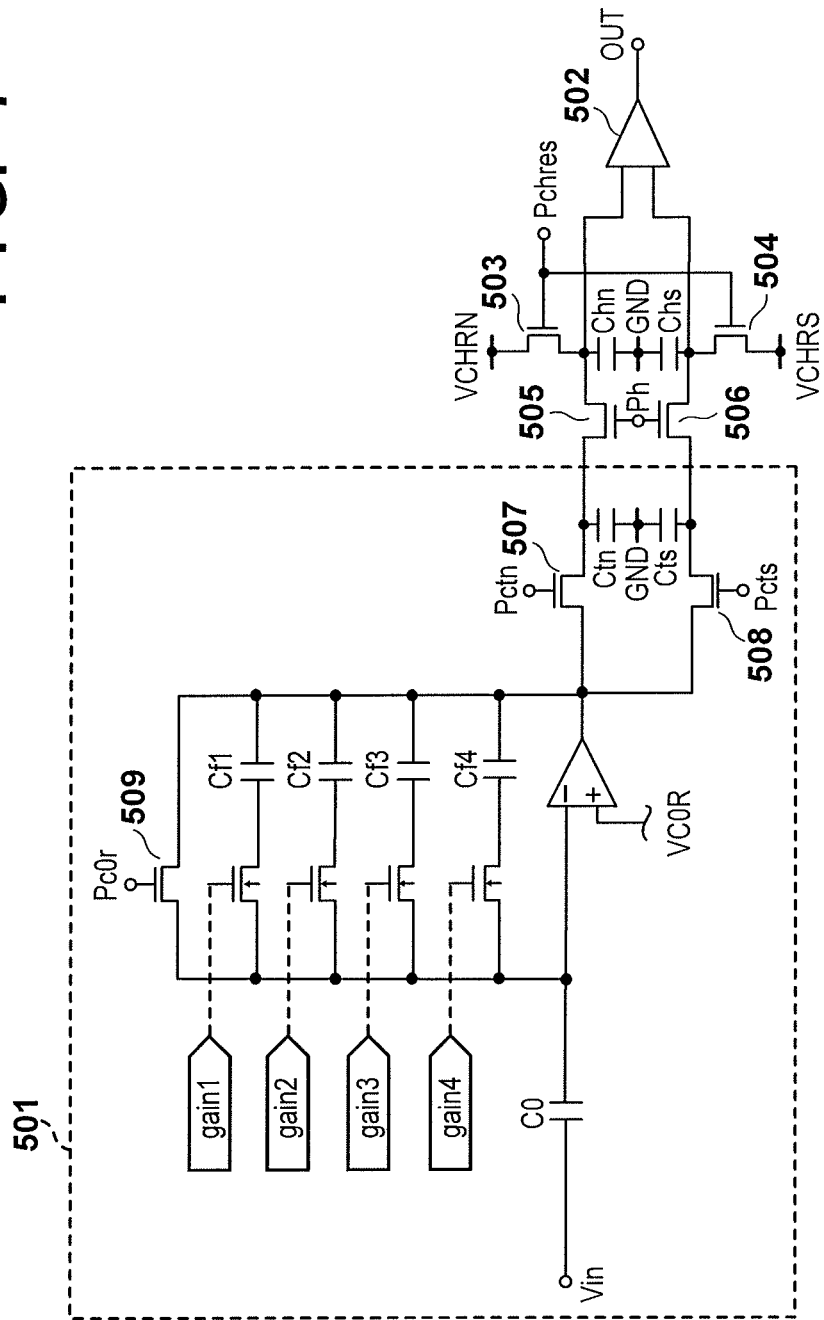
FIG. 7 is a circuit diagram showing a column amplifier and a readout circuit.

The source of the selection MOS transistor 306 is connected to the vertical output line arranged to extend in the vertical direction. Note that the sources of the selection MOS transistors 306 of the pixels arranged on the same column are connected to the same vertical output line. Furthermore, the vertical output line is connected to the corresponding current source 407. The circuit operation of the readout circuit 402 or 410 shown in FIG. 6 for one column will be described with reference to FIG. 7. In FIG. 7, a column amplifier 501 is surrounded by broken lines and column amplifiers 501 the number of which is equal to that of columns of the image sensor are arranged. Each vertical output line is connected to a terminal Vin.

The column amplifier 501 amplifies a signal input from the vertical output line to the terminal Vin. An amplification gain is determined based on a capacitance ratio C0/Cf of a capacitor C0 to a capacitor Cf. It is configured to select the capacitance of the capacitor Cf by a switch, and it is possible to set various gains (amplification factors) by combining the capacitor Cf with the capacitor C0. Note that although the column amplifier 501 amplifies the pixel signals for each column in this embodiment, the AFE 102, DFE 103, or image processing apparatus 105 can amplify the pixel signals after reading them out from the image sensor. Amplifying the pixel signals by the column amplifier or by processing after reading out the pixel signals can improve the sensitivity. Therefore, a gain at the time of amplification is set according to the set sensitivity (ISO sensitivity).

Figure 8:
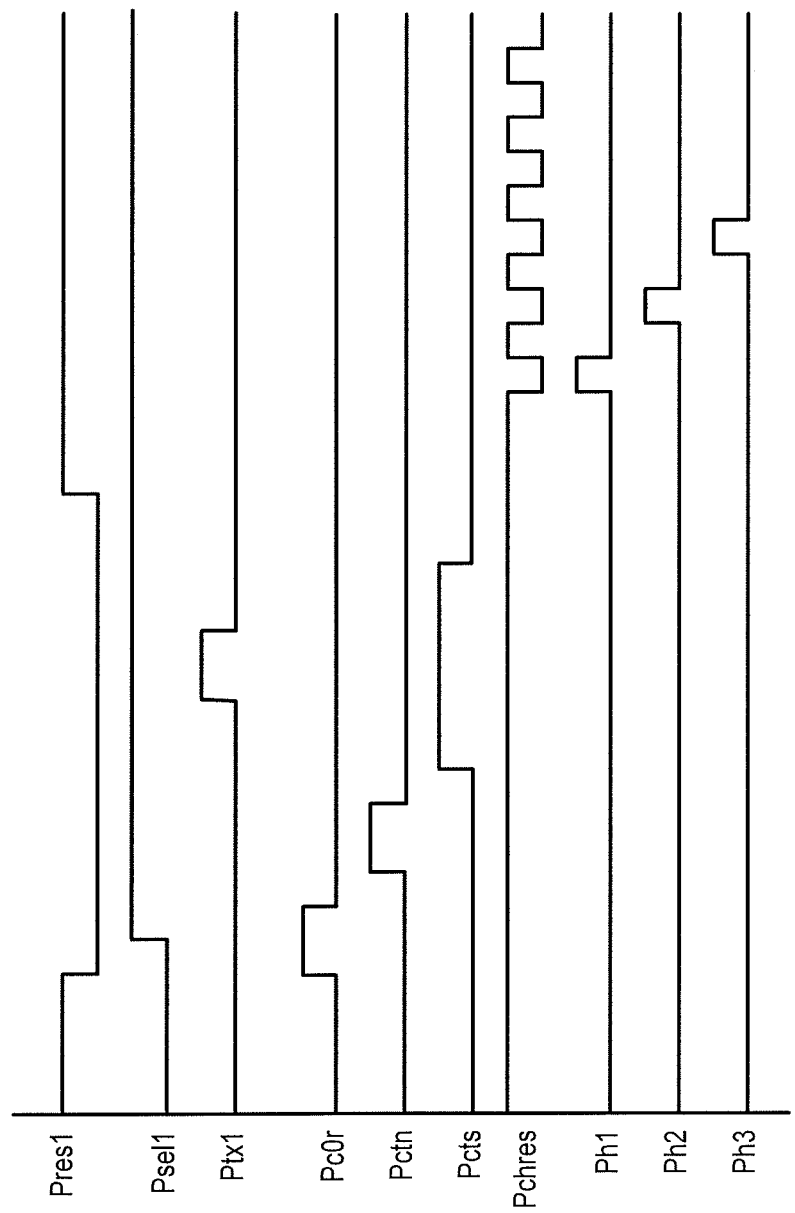
FIG. 8 is a timing chart showing driving of the image sensor.

An operation of reading out signals from all the pixels of the image sensor when capturing a still image will be described with reference to FIGS. 3, 6, and 7 and a timing chart shown in FIG. 8. Prior to reading out signal charges from the photodiodes 301, the second row selecting line Pres(1) is set at high level, and the gates of the reset MOS transistors 303 are set at high level. This resets the gates of the amplification MOS transistors 305, that is, the potentials of the FDs 304 to the reset voltage. The second row selecting line Pres(1) is returned to low level and, at the same time, gates PcOr of clamp switches 509 are set at high level.

After that, the third row selecting line Psel(1) is set at high level, and the gates of the selection MOS transistors 306 are set at high level. With this operation, reset signals (noise signals) on which reset noise is superimposed are read out to the corresponding vertical output lines, and clamped to the clamp capacitors C0 of the column amplifiers 501 on the respective columns. After the gates PcOr of the clamp switches 509 are returned to low level, when gates Pctn of transfer switches 507 are set at high level, the noise signals amplified at the set gain are output and held in noise holding capacitances Ctn arranged on the respective columns.

After setting gates Pcts of transfer switches 508 at high level, the first row selecting line Ptx(1) is set at high level. After that, the gates of the transfer MOS transistors 302 are set at high level to transfer the signal charges of the photodiodes 301 to the FDs 304, that is, the gates of the amplification MOS transistors 305, thereby reading out the pixel signals to the corresponding vertical output lines. Subsequently, the first row selecting line Ptx(1) is returned to low level, the gates of the transfer MOS transistors 302 are set at low level, and the gates Pcts of the transfer switches 508 are set at low level. With this operation, the pixel signals amplified at the set gain are read out into signal holding capacitances Cts arranged on respective columns. With above-described operation, the noise signals and pixel signals of the pixels connected to the first row are held in the holding capacitances Ctn and Cts connected to the respective columns.

After that, a signal Ph supplied from the horizontal shift register 406 or 409 sequentially sets gates of horizontal transfer switches 505 and 506 on each column at high level. Voltages held in the holding capacitances Ctn and Cts are read out into capacitors Chn and Chs, undergo subtraction processing in an output amplifier 502, and sequentially output to an output terminal OUT. Reset switches 503 and 504 reset the capacitors Chn and Chs to reset voltages VCHRN and VCHRS, respectively, between signal readout operations for the respective columns. The operation of reading out the signals of the pixels connected to the first row is then completed. Similarly, the signals of pixel cells connected to the second row and subsequent rows are sequentially read out according to control signals from the vertical shift register 401, thereby completing the operation of reading out all the pixels. At the time of capturing a still image, it is possible to obtain a high-resolution image by reading out output signals from all the pixels.

On the other hand, when capturing a moving image, it is necessary to perform a readout operation at high speed to obtain a high frame rate (for example, 30 frames/sec or higher). Furthermore, a moving image resolution complying with the standard which has currently become widespread is up to 1,920×1,080 pixels (about 2 million pixels). This number of pixels is much smaller than that of pixels (about 10 million pixels or more) of a general image sensor used in a digital camera. When capturing a moving image by a digital camera, therefore, decreasing processing for decreasing the number of pixels is performed. As described above, in terms of reducing the data amount transferred from the image sensor, it is desirable to decrease the number of pixels whose signals are read out from the image sensor. Examples of a method of decreasing the number of pixels whose signals are read out from the image sensor are a method of reading out the pixel signals with thinning out the pixel signals (thinning readout mode) and a method of adding (mixing) and reading out the pixel signals (mixing readout mode).

The thinning readout mode will be described first. In the thinning readout mode, the pixel signals are read out by controlling the vertical shift register 401 to sequentially select discrete rows. For example, in ⅓ thinning driving for reading out signals from pixels on one of three rows, the vertical shift register 401 sequentially selects a pixel row every three rows, for example, the first, fourth, and seventh rows, and reads out signals from the selected pixels. That is, the output of a row selecting signal from the vertical shift register 401 is controlled to select a pixel row every three rows, thereby reading out pixel signals to the vertical output line 408. A row between rows to be read out is skipped. Processing for a row to be read out is performed similarly to a readout operation for one row when reading out all the pixels. Processing by the column amplifier after reading out the signal to the vertical output line is also performed in the same manner, thereby outputting the pixel signal from the image sensor 101.

The FD mixing readout mode (first mixing readout mode) will be described next. In this embodiment, as described with reference to FIG. 3, the charges of the plurality of pixels arranged in the vertical direction are mixed and output as an image signal. In the FD addition readout mode, when reading out the signal charges from the photodiodes, the fourth row selecting lines Padd(n) can be set at high level to turn on the addition switches 308 each connecting the FDs, thereby mixing the charges of the adjacent FDs.

Figure 9:
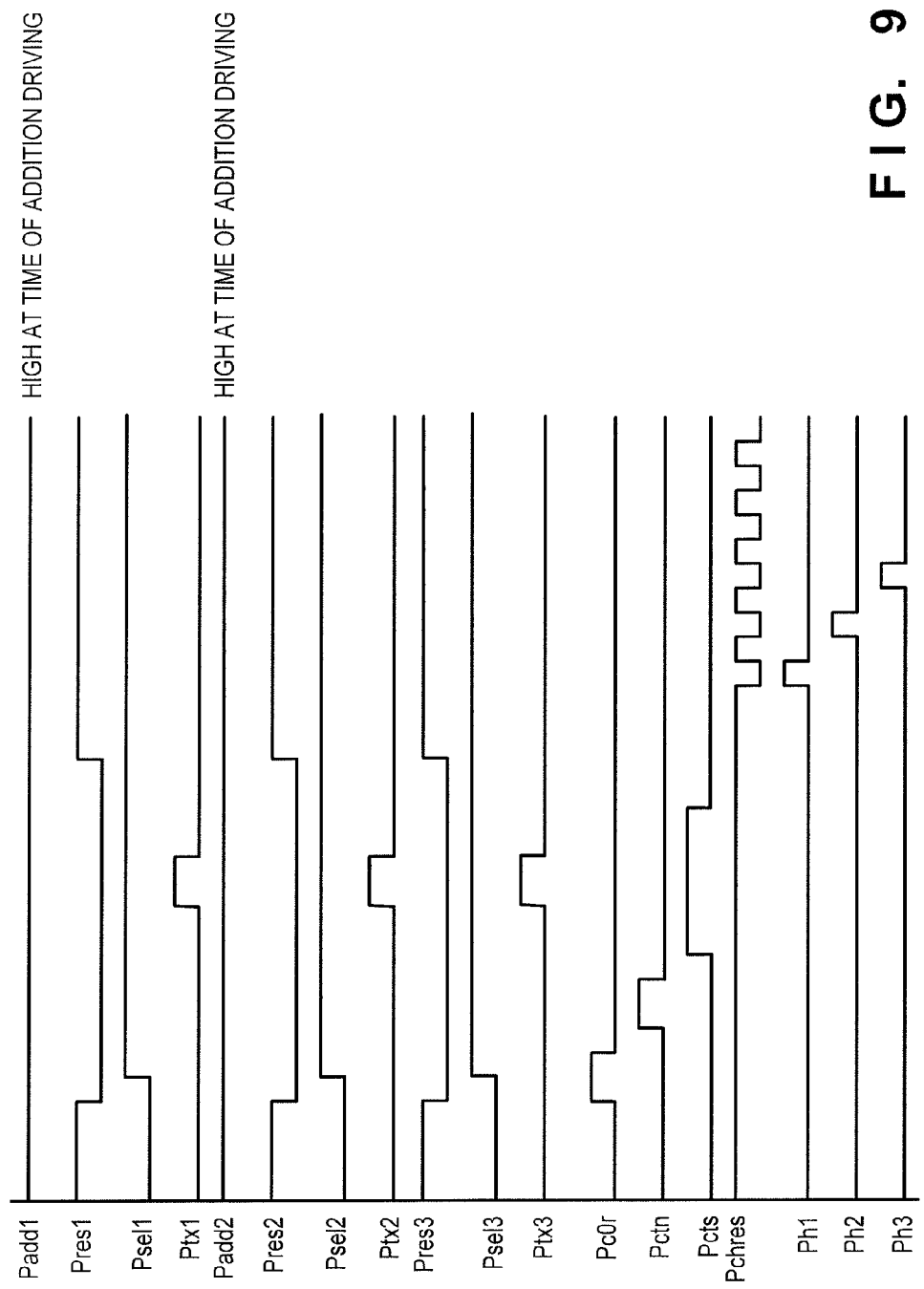
FIG. 9 is a timing chart showing mixing driving of the image sensor.

An example of an operation in the FD mixing readout mode will be described with reference to a timing chart shown in FIG. 9. A case in which the charges of the three pixels in the vertical direction shown in the block diagram of FIG. 6 showing the CMOS image sensor are mixed in the FDs will be explained. During the mixing readout mode, the fourth row selecting lines Padd(1) and Padd(2) are set at high level to turn on the two addition switches 308 each connecting the FDs of the pixels adjacent to each other in the vertical direction. As a result, the FDs of the three pixels in the vertical direction are connected. Prior to reading out signal charges from the photodiodes 301, the second row selecting lines Pres(1), Pres(2), and Pres(3) are set at high level. Then, the gates of the reset MOS transistors 303 shown in FIG. 3 are set at high level to turn on the reset MOS transistors 303. This resets the gates of the amplification MOS transistors 305, that is, potentials of the FDs 304 to the reset voltage. The second row selecting lines Pres(1), Pres(2), and Pres(3) are returned to low level and, at the same time, the gate Pc0r of the clamp switch 509 is set at high level and turned on.

Subsequently, the third row selecting lines Psel(1), Psel(2), and Psel(3) are set at high level to turn on the selection MOS transistors 306. With this operation, noise signals on which reset noise is superimposed are read out to the vertical output line, and clamped to the capacitor C0 of the column amplifier 501 on each column. After the gate Pc0r of the clamp switch 509 is returned to low level, the gate Pctn of the transfer switch 507 is set at high level. As a result, the noise signal amplified at the set gain is held in the noise holding capacitance Ctn arranged on each column via the transfer switch 507.

A pixel signal readout operation will be explained. After the gate Pcts of the transfer switch 508 is set at high level, the first row selecting lines Ptx(1), Ptx(2), and Ptx(3) are set at high level. The transfer MOS transistors 302 are turned on, and the signal charges of the photodiodes 301 are transferred to the FDs 304. The signal charges of the photodiodes 301 on the three rows are added in the FDs 304, and output to the vertical output line via the amplification MOS transistors 305. The signal is amplified at the set gain, and read out into the signal holding capacitance Cts arranged on each column.

After the first row selecting lines Ptx(1), Ptx(2), and Ptx(3) are returned to low level to turn off the transfer MOS transistors 302, the gate Pcts of the transfer switch 508 is set at low level. With the above-described operation, the signals of the pixels which are connected to the first, second, and third rows of the pixel region and are adjacent to each other in the vertical direction are mixed in the FDs, and held in the noise holding capacitance Ctn and signal holding capacitance Cts which are connected to each column. After that, the signal Ph supplied from the horizontal shift register 406 or 409 sequentially sets the gates of the horizontal transfer switches 505 and 506 on each column at high level. Voltages held in the holding capacitances Ctn and Cts are read out into the capacitors Chn and Chs, undergo subtraction processing in the output amplifier 502, and sequentially output to the output terminal OUT. The reset switches 503 and 504 reset the capacitors Chn and Chs to the reset voltages VCHRN and VCHRS, respectively, between signal readout operations for the respective columns. The addition readout operation for the pixel cells Pixel in the vertical direction which are connected to the first, second, and third rows then ends.

As described above, the image capturing apparatus including the image sensor according to this embodiment can execute both the FD mixing readout mode and the thinning readout mode. If the number of pixels is decreased in the FD mixing readout mode, it is possible to obtain a satisfactory image almost without moiré. Furthermore, since it is possible to reduce the number of pixels to be read out by performing addition within the image sensor, the apparatus has advantage when requiring a high-speed readout operation, for example, when recording a moving image. However, while the addition switch 308 is ON, noise is input to the addition switch 308 via the parasitic capacitance. Therefore, the influence of the noise may generate horizontal stripe noise in an output image. The influence of the horizontal stripe noise becomes more conspicuous as the amplification factor for the output of a pixel is higher, that is, the set sensitivity (ISO sensitivity) is higher.

On the other hand, when the sensitivity is set to high, random noise is larger than that when the sensitivity is set to low. Even in the thinning readout mode, therefore, moiré hardly occurs. The image capturing apparatus of the first embodiment of the present invention changes the readout mode for driving the image sensor according to the set imaging conditions. If, for example, the sensitivity set through the operation unit 107 falls within a predetermined low sensitivity range (ISO400 or lower in an example shown in FIG. 10), the mixing readout mode is set. If the set sensitivity falls within a predetermined high sensitivity range (ISO800 or higher in the example shown in FIG. 10), the thinning readout mode is set. Note that the sensitivity at which the readout mode is switched between the FD mixing readout mode and the thinning readout mode depends on the characteristics of the image sensor and its surrounding circuits, and can thus be experimentally preset. Assume that there is no settable sensitivity between ISO400 and ISO800. However, for an image capturing apparatus in which intermediate sensitivity is settable, for example, the readout mode may be decided depending on whether ISO400 is exceeded or not. That is, the readout mode may be decided using one threshold.

Since the amount of noise generated in a semiconductor changes depending on the temperature, switching between the FD mixing readout mode and the thinning readout mode may be decided in consideration of temperature conditions (for example, the temperature near the image sensor 101) at the time of imaging in addition to the sensitivity, as shown in FIG. 11. Furthermore, the user may be allowed to set the readout mode switching conditions and perform a switching operation.

When switching the readout mode for decreasing the number of pixels in this way, the capacitance of the FD for each pixel at the time of reading out the pixel is different between the thinning readout mode and the FD mixing readout mode in which charges are mixed and read out from the FDs. Furthermore, the influence of the parasitic capacitance on the addition switch 308 and FD 304 is also different. As a result, the output level is different between the FD mixing readout mode and the thinning readout mode. To solve this problem, a correction coefficient for the output level difference between the FD mixing readout mode and the thinning readout mode is stored in advance. Strictly speaking, the level difference is different for each image sensor. Therefore, a method is desirable, in which measurement is performed at the time of manufacturing an image sensor, and the obtained value is held in a ROM or the like, and corrected at the time of image processing. Alternatively, in each of the FD mixing readout mode and the thinning readout mode at each ISO sensitivity, the sensitivity may be adjusted to comply with a predetermined standard output, an obtained adjustment value may be held in a ROM, and the adjustment value may be read out according to the imaging conditions and driving to correct a pixel signal.

As described above, in this embodiment, when pixel signals the number of which is smaller than the total number of pixels of the image sensor are read out, the readout mode is selected according to the set imaging conditions. If the sensitivity is equal to or lower than a predetermined value, the readout mode is set to the FD mixing readout mode; otherwise, the readout mode is set to the thinning readout mode. At the time of low-sensitivity image capturing or high-sensitivity image capturing, it is possible to capture a moving image having satisfactory image quality. It is also possible to further suppress the influence of noise at the time of high-sensitivity image capturing by switching the readout mode in consideration of the temperature at the time of imaging.

[Second Embodiment]

The second embodiment of the present invention will be described. In this embodiment, one of the FD mixing readout mode and the thinning readout mode is selected by evaluating the image quality at the time of imaging. The arrangement of an image capturing apparatus and a method of driving an image sensor are the same as those in the first embodiment and a description thereof will be omitted.

Figure 12:
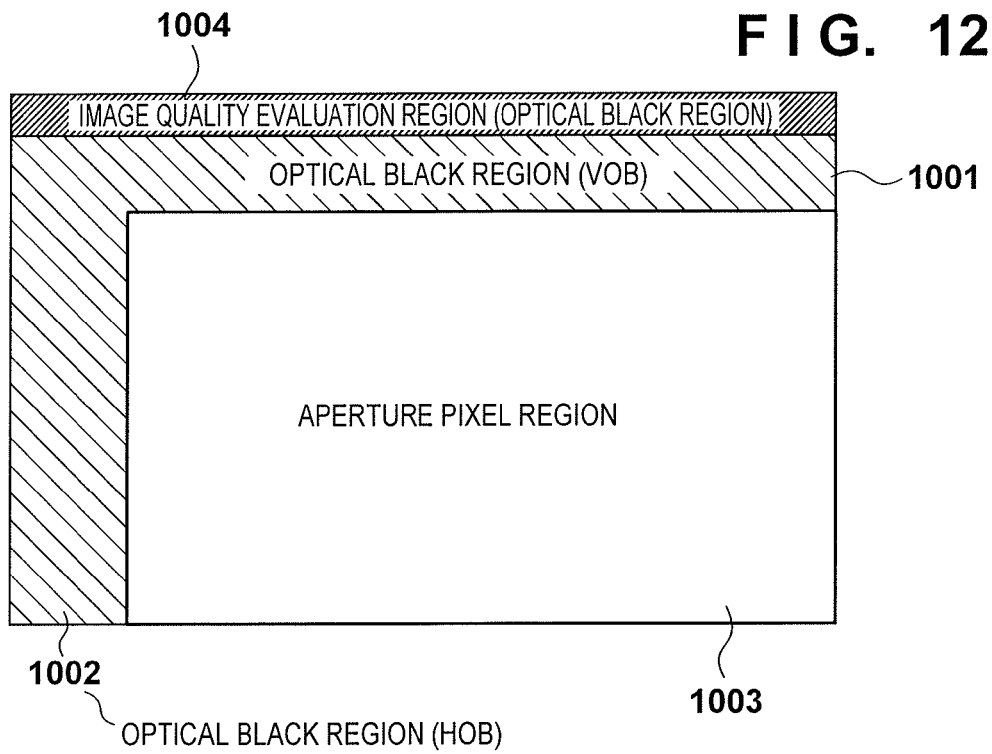
FIG. 12 is a view showing an example of the arrangement of the pixel region of an image sensor according to the second embodiment of the present invention.

FIG. 12 shows an example of the arrangement of the pixel region of a solid-state image capturing apparatus. As in FIG. 2, the pixel region is formed by an aperture pixel region 1003 having aperture pixels, and non-aperture pixel regions 1001 and 1002. The non-aperture pixel regions include a horizontal optical black pixel region (HOB) 1002 and a vertical optical black pixel region (VOB) 1001. Each pixel of the aperture pixel region 1003 accumulates charges generated according to incident light, and outputs them. A partial region of the VOB 1001 including pixels of a plurality of rows is used as an image quality evaluation region 1004 for evaluating the image quality.

When reading out pixel signals from the pixels of the VOB 1001, HOB 1002, and aperture pixel region 1003, the readout mode is switched between the mixing readout mode and the thinning readout mode in accordance with the evaluated image quality. The pixel signals of the pixels of the image quality evaluation region 1004 are always read out in the mixing readout mode. The image quality of the image quality evaluation region 1004 from which the pixel signals have been read out in the mixing readout mode is evaluated based on, for example, the level of horizontal stripe noise. It is controlled to set the readout mode to the thinning readout mode if the region includes large horizontal stripe noise and the image quality is evaluated to be low, and to the FD mixing readout mode if the image quality is not evaluated to be low.

The method of evaluating the image quality will be further described. An average value Ave(i) of respective addition outputs is calculated from the pixel signals of the image quality evaluation region 1004, which have been read out in the FD mixing readout mode. A standard deviation $\sigma$ of the average value Ave in the entire image quality evaluation region 1004 is calculated. If the standard deviation $\sigma$ is smaller than a determination value, the readout mode is switched to the mixing readout mode. If the standard deviation $\sigma$ is equal to or larger than the determination value, the readout mode is switched to the thinning readout mode. The determination value may be set for each ISO sensitivity value. Alternatively, a moving average Mave(i) for several rows in the image quality evaluation region is calculated, thereby obtaining a maximum value X of Ave(i)−Mave(i). If the maximum value X is smaller than a threshold, the readout mode is switched to the FD mixing readout mode. If the maximum value X is equal to or larger than the threshold, the readout mode is switched to the thinning readout mode. Alternatively, the number of values of Ave (i)−Mave(i) exceeding the threshold may be used for evaluation. The methods described here are examples of the image quality evaluation method, and the present invention is not limited to them.

Figure 13:
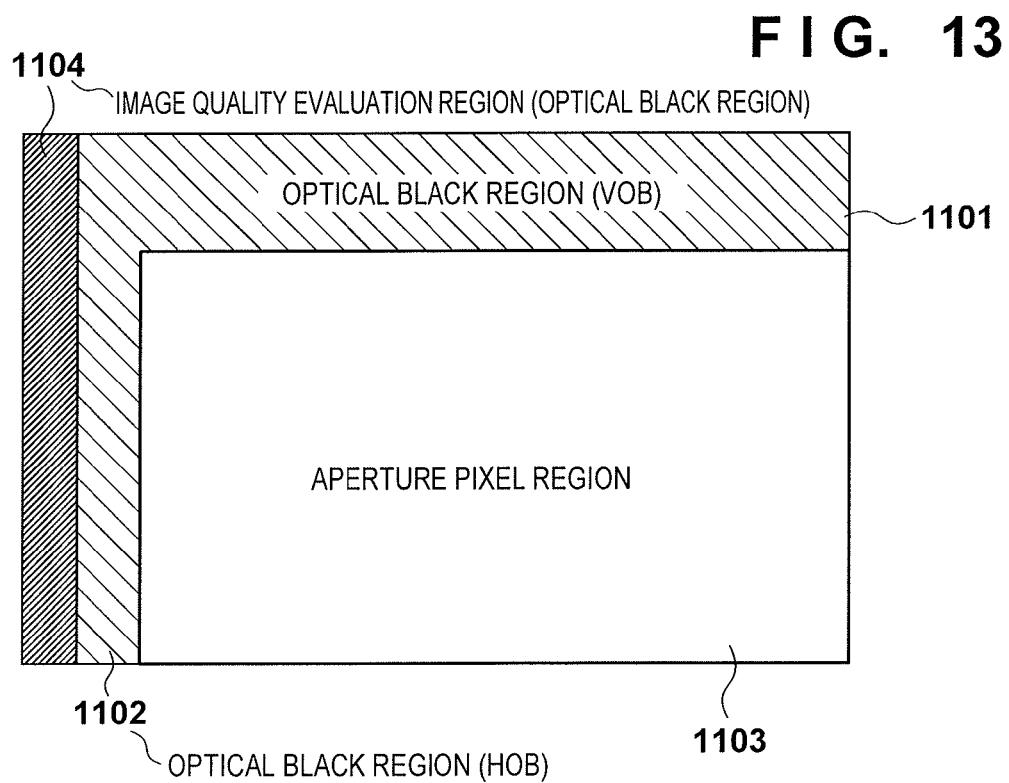
FIG. 13 is a view showing another example of the arrangement of the pixel region of the image sensor according to the second embodiment of the present invention.

Note that an HOB region 1104 may be used as a region for image quality evaluation, as shown in FIG. 13. Alternatively, instead of using a partial region of the pixel region, for example, the image quality may be evaluated based on pixel signals output from the entire shielded pixel region. If the HOB region 1104 or the entire shielded pixel region is used as an image quality evaluation region, a determination result cannot be calculated unless a readout operation is performed up to the last row and, therefore, the readout mode is reflected in the next frame.

Note that the apparatus may be provided with a function in which when the readout mode is switched by evaluating the image quality, the user is notified of it. Alternatively, if degradation in image quality is determined, imaging may be canceled instead of switching the readout mode, or the user may select the setting.

As describe above, in this embodiment, since one of the FD mixing readout mode and the thinning readout mode is selected based on the image quality of an actually captured image, more strict determination becomes possible. Consequently, for example, it becomes possible to appropriately switch the readout mode between a scene in which noise tends to be conspicuous and a scene in which noise is hardly conspicuous, thereby implementing an accurate and appropriate readout operation. It is, therefore, possible to further improve the image quality of a moving image.

[Third Embodiment]

The third embodiment of the present invention will be described. The arrangement of an image capturing apparatus and image sensor is basically the same as that in the first embodiment and a description thereof will be omitted. In the third embodiment, the image sensor can be driven in a mixing readout mode (second mixing readout mode) in which the image signals of a plurality of pixels are output to a vertical output line, and mixed, in addition to the FD mixing readout mode (first mixing readout mode) and the thinning readout mode. The second mixing readout mode can be implemented by turning on selection MOS transistors 306 of a plurality of pixels without turning on addition switches 308 at the time of reading out signal charges. That is, the image capturing apparatus including the image sensor according to this embodiment can execute a readout method in each of the first mixing readout mode in which the addition switches 308 are turned on, the second mixing readout mode in which the addition switches 308 are not turned on, and the thinning readout mode.

Decreasing the number of pixels in the FD mixing readout mode (first mixing readout mode) makes it possible to obtain a satisfactory image almost without moiré. Furthermore, since mixing pixel signals within the image sensor can decrease the number of pixels whose signals are read out, the apparatus has advantage when requiring a high-speed readout operation, for example, when recording a moving image. However, while the addition switches 308 are ON, noise is input to the addition switches 308 via the parasitic capacitances. Therefore, the influence of the noise may generate horizontal stripe noise in an output image. The influence of the horizontal stripe noise becomes more conspicuous as the amplification factor for the outputs of pixels is higher, that is, the set sensitivity (ISO sensitivity) is higher.

On the other hand, in the second mixing readout mode in which the addition switches 308 are not turned on, no noise is input to the addition switches 308 via the parasitic capacitances, and thus no horizontal stripe noise is generated even in imaging at high ISO sensitivity. Note that if the output level difference between pixels whose signals are mixed is large, the mixed output is limited by an operation range, thereby unwantedly degrading the image quality. This is readily influenced in imaging in which a signal amount to be processed is large and the gain is low.

To solve this problem, the image capturing apparatus of the third embodiment changes the readout mode for driving the image sensor according to set imaging conditions. For example, if the sensitivity set through the operation unit 107 falls within a predetermined low sensitivity range (ISO400 or lower in an example shown in FIG. 14), the first mixing readout mode in which the addition switches 308 are turned on is set. If the set sensitivity falls within a predetermined high sensitivity range (ISO800 or higher in the example shown in FIG. 14), the second mixing readout mode in which the addition switches are not turned on is set. Note that the sensitivity at which the readout mode is switched between the first mixing readout mode and the second mixing readout mode depends on the characteristics of the image sensor and its surrounding circuits, and can thus be experimentally preset. Assume that there is no settable sensitivity between ISO400 and ISO800. However, for an image capturing apparatus in which intermediate sensitivity is settable, for example, the readout mode may be decided depending on whether ISO400 is exceeded or not. That is, the readout mode may be decided using one threshold.

Since the amount of noise generated in a semiconductor changes depending on the temperature, switching between the first mixing readout mode and the second mixing readout mode may be decided in consideration of temperature conditions (for example, the temperature near an image sensor 101) at the time of imaging in addition to the sensitivity, as shown in FIG. 15. Furthermore, the user may be allowed to set the readout mode switching conditions and perform a switching operation.

When switching the readout mode for decreasing the number of pixels in this way, the capacitance of the FD for each pixel at the time of reading out the signal is different between the first mixing readout mode and the second mixing readout mode. Furthermore, the influence of the parasitic capacitance on the addition switch 308 and an FD 304 is also different. As a result, the output level is different between the first mixing readout mode and the second mixing readout mode. To solve this problem, a correction coefficient for the output level difference between the first mixing readout mode and the second mixing readout mode is stored in advance. Strictly speaking, the level, difference is different for each image sensor. Therefore, a method is desirable, in which measurement is performed at the time of manufacturing an image sensor, and the obtained value is held in a ROM or the like, and corrected at the time of image processing. Alternatively, in each of the first mixing readout mode and the second mixing readout mode at each ISO sensitivity value, the output level may be adjusted to comply with a predetermined standard output, an obtained adjustment value may be held in a ROM, and the adjustment value may be read out according to the imaging conditions and driving to correct a pixel signal.

As described above, in this embodiment, when pixel signals the number of which is smaller than the total number of pixels of the image sensor are read out, the readout mode is selected according to the set imaging conditions. If the sensitivity is equal to or lower than a predetermined value, the readout mode is set to the first mixing readout mode; otherwise, the readout mode is set to the second mixing readout mode. At the time of low-sensitivity imaging or high-sensitivity imaging, it is possible to capture a moving image having satisfactory image quality. It is also possible to further suppress the influence of noise at the time of high-sensitivity imaging by switching the readout mode in consideration of the temperature at the time of imaging.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-104516 filed May 16, 2013 and No. 2014-060829 filed Mar. 24, 2014, which are hereby incorporated by reference herein in their entirety.

What is claimed is:

1. An image capturing apparatus comprising:
an image sensor including a pixel region in which a plurality of pixels are arranged in a row direction and a column direction, and readout circuit configured to read out pixel signals from the plurality of pixels; and
a controller configured to select one of a thinning readout mode in which the pixel signals are read out from the plurality of pixels while thinning out the plurality of pixels and a combining readout mode in which the pixel signals of the plurality of pixels are combined and read out, and to control the readout circuit to read out the pixel signals in the selected readout mode,
wherein the controller controls the readout circuit to read out the pixel signals in the combining readout mode in a case where a sensitivity is equal to or lower than a predetermined sensitivity, and to read out the pixel signals in the thinning readout mode in a case where the sensitivity is higher than the predetermined sensitivity.

2. The apparatus according to claim 1, wherein thinning processing or combining processing performed in a case where the readout circuit reads out the pixel signals is performed in the column direction.

3. The apparatus according to claim 1, wherein the controller further controls the readout circuit according to the temperature at the time of imaging.

4. An image capturing apparatus comprising:
an image sensor including a pixel region in which a plurality of pixels are arranged in a row direction and a column direction, and a readout circuit configured to read out pixel signals from the plurality of pixels; and
a controller configured to select one of a thinning readout mode in which the pixel signals are read out from the plurality of pixels while thinning out the plurality of pixels and a combining readout mode in which the pixel signals of the plurality of pixels are combined and read out, and to control the readout circuit to read out the pixel signals in the selected readout mode,
wherein the controller controls the readout circuit to read out the pixel signals in the combining mode in a case where a noise level included in the pixel signals is not greater than a predetermined noise level, and to read out the pixel signals in the thinning readout mode in a case where the noise level is greater than the predetermined noise level.

5. The apparatus according to claim 4, wherein thinning processing or combining processing performed in a case where the readout circuit reads out the pixel signals is performed in the column direction.

6. The apparatus according to claim 4, wherein the controller evaluates the noise level included in the pixel signals read out from the pixels of partial regions.

7. The apparatus according to claim 6, wherein the controller evaluates the noise level included in the pixel signals read out from pixels of an optical black pixel region.

8. The apparatus according to claim 6, wherein the controller evaluates the noise level included in the pixel signals read out from the pixels of a partial region in the combining readout mode.

9. The apparatus according to claim 4, wherein a signal level difference between the combining readout mode and the thinning readout mode is corrected.

10. The apparatus according to claim 4, wherein in the combining readout mode, charges of floating diffusions of the plurality of pixels are combined.

11. A method of controlling an image capturing apparatus including an image sensor that includes a pixel region in which a plurality of pixels are arranged in a row direction and a column direction and a readout circuit configured to read out pixel signals from the plurality of pixels, the method comprising:
selecting by a controller one of a thinning read mode in which the pixel signals are read out from the plurality of pixels while thinning out the plurality of pixels and a combining readout mode in Which the pixel signals of the plurality of pixels are combined and read out, and to control the readout circuit to read out the pixel signals in the selected readout mode,
wherein the controller controls the readout circuit to read out pixel signals in the combining readout mode in a case where a sensitivity is equal to or lower than a predetermined sensitivity, and to read out the pixel signals in the thinning readout mode in a case where the sensitivity is higher than the predetermined sensitivity.

12. A method of controlling an image capturing apparatus including an image sensor that includes a pixel region in which a plurality of pixels are arranged in a row direction and a column direction and a readout circuit configured to read out pixel signals from the plurality of pixels, the method comprising:
- selecting by a controller one of a thinning readout mode in which the pixel signals are read out from the plurality of pixels while thinning out the plurality of pixels and a combining readout mode in which the pixel signals of the plurality of pixels are combined and read out, and to control the readout circuit to read out the pixel signals in the selected readout mode,
- wherein the controller controls the readout circuit to read out the pixel signals in the combining readout mode in a case where a noise level included in the pixel signals is not greater than a predetermined noise level, and to read out the pixel signals in the thinning readout mode in a case where the noise level is greater than the predetermined noise level.

13. A non-transitory computer-readable storage medium storing a program for causing a computer of an image capturing apparatus to function as each unit of an image capturing apparatus, the image capturing apparatus comprising:
- an image sensor including a pixel region in which a plurality of pixels are arranged in a row direction and a column direction, and readout circuit configured to read out pixel signals from the plurality of pixels; and
- a controller configured to select one of a thinning readout mode in which the pixel signals are read out from the plurality of pixels While thinning out the plurality of pixels and a combining readout mode in which the pixel signals of the plurality of pixels are combined and read out, and to control the readout circuit to read out the pixel signals in the selected readout mode,
- wherein the controller controls the readout circuit to read out the pixel signals in the combining readout mode in a case where a sensitivity is equal to or lower than a predetermined sensitivity, and to read out the pixel signals in the thinning readout mode in a case where the sensitivity is higher than the predetermined sensitivity.

14. The apparatus according to claim 1, wherein in the combining readout mode, charges of floating diffusions of the plurality of pixels are combined.

\* \* \* \* \*